United States Patent [19]
Schreiner

[11] 4,280,370
[45] Jul. 28, 1981

[54] CLUTCH ASSEMBLY FOR GEAR-TYPE TRANSMISSION SYSTEM

[75] Inventor: Friedrich Schreiner, Kehlen, Fed. Rep. of Germany

[73] Assignee: Zahnradfabrik Friedrichshafen AG, Friedrichshafen, Fed. Rep. of Germany

[21] Appl. No.: 127,065

[22] Filed: Mar. 4, 1980

[30] Foreign Application Priority Data

Mar. 8, 1979 [DE] Fed. Rep. of Germany ....... 2909123

[51] Int. Cl.³ .......................... F16D 11/00; F16H 3/38
[52] U.S. Cl. ...................................... 74/339; 192/53 F
[58] Field of Search ................ 192/53 G, 53 F, 53 E; 74/339, 331

[56] References Cited

U.S. PATENT DOCUMENTS

| | | | |
|---|---|---|---|
| 1,737,451 | 11/1929 | Clark | 74/339 |
| 1,744,576 | 1/1930 | Rhett | 74/339 X |
| 2,259,527 | 10/1941 | Manville | 192/53 F |
| 2,743,625 | 5/1956 | Moffett | 74/339 X |
| 2,930,462 | 3/1960 | Willis | 74/339 X |

FOREIGN PATENT DOCUMENTS

863753 1/1953 Fed. Rep. of Germany ............. 74/339
1630452 5/1971 Fed. Rep. of Germany .

OTHER PUBLICATIONS

Hydrodynamischer Kupplungs-Wandler Mit Turbine, pp. 82–83.
"Principles of Automotive Vehicles", Manual TM9-8000 and TO36-1-76, published Jan., 1956, by Dept. of Army and Air Force, pp. 284–288.

*Primary Examiner*—Rodney H. Bonck
*Attorney, Agent, or Firm*—Karl F. Ross

[57] ABSTRACT

A sliding gear keyed or splined to a main shaft has external teeth selectively engageable with either of two driving gears on a pair of continuously rotating countershafts and in its neutral position is releasably coupled by one or more ball checks to a surrounding control ring for joint axial motion. The ring is provided with beveled surfaces enabling its frictional rotary entrainment by similar surfaces of the driving gears upon a limited axial shifting of the sliding gear in one or the other direction. The control ring also has one or more internal ridges extending between teeth of the sliding gear for joint rotation therewith; in several embodiments, these ridges are sufficiently narrower than the spacing between adjacent gear teeth to allow for a limited relative rotation between ring and gear, the ridges then having retaining formations which prevent a relative axial shift into a meshing position of the sliding gear until synchronism has been achieved between the main shaft and the corresponding countershaft.

6 Claims, 8 Drawing Figures

CLUTCH ASSEMBLY FOR GEAR-TYPE TRANSMISSION SYSTEM

FIELD OF THE INVENTION

My present invention relates to a clutch assembly for a gear-type automotive or other transmission system in which a driven shaft is provided with a gear shifter for operatively connecting it with a continuously rotating but unshiftable driving gear or, possibly, with either of two such driving gears on an axis or axes offset from that of the driven shaft.

BACKGROUND OF THE INVENTION

The use of a jaw clutch for selectively connecting a main or driven shaft with either of two constantly rotating driving gears on countershafts paralleling the driven shaft has been described in German Pat. No. 1,630,452. Clutches of this nature are also available under the designation MACK TRL-107, for example. In order to avoid gear clashing, such systems must be provided with separate synchronizing means.

In constant-mesh gear transmission, especially in those of the synchromesh type, it is known to mount a sliding gear in a non-rotatable manner (through keying or splining) on a driven shaft adjacent a coaxial driving gear of the same pitch and diameter, the external teeth of the sliding gear being in mesh with internal gears of a surrounding sleeve which can be axially shifted to bridge the two gears. The sliding gear and its sleeve are releasably coupled together with the aid of one or more spring-loaded ball checks allowing their joint displacement by a shift fork linked with the sleeve. Upon such displacement from a disengaged position toward an engaged position, a frustoconical inner surface of the sliding gear comes into contact with a correspondingly tapered outer surface of the driving gear whereby the assembly of sliding gear and sleeve is frictionally entrained and brought into synchronism with the driving gear. At this point the sleeve can be axially shifted with reference to the sliding gear, against the yieldable retaining force of the ball checks, into its bridging position to establish a positive driving connection between the two gears.

A synchromesh clutch of this type, which obviously cannot be used with a countershaft, has been described in "Principles of Automotive Vehicles", Manual TM9-8000 and TO36A-1-76, published January 1956 by the Department of the Army and the Air Force, pages 284-288.

OBJECTS OF THE INVENTION

The general object of my present invention is to provide a self-synchronizing clutch assembly which affords the advantages of a synchromesh clutch in a transmission system in which a driven shaft is to be engageable with at least one continuously rotating driving gear on a countershaft offset therefrom.

A more particular object of my invention is to provide means in such an assembly for positively delaying a meshing engagement between a driving gear and a sliding gear on the driven shaft until the two gears have achieved synchronous rotation.

SUMMARY OF THE INVENTION

In accordance with my present invention, a sliding gear nonrotatably mounted on a driven shaft is coaxially surrounded by a control ring with which it is releasably coupled for joint axial displacement by indexing means such as the aforementioned ball checks. In contradistinction to the sleeve of the above-described synchromesh clutch, however, the control ring of my novel clutch assembly does not have internal teeth engageable with the external teeth of the unshiftable driving gear or gears but merely has a tapered peripheral surface confronting a tapered surface of the driving gear, the two tapered surfaces being separated from each other in a position of disengagement but contacting each other upon a shifting of the sliding gear and the control ring into an intermediate position (with the aid of a fork or similar operating means) preparatorily to a further shifting of the sliding gear alone, decoupled from the control ring, into an engaged position in which its external teeth mesh with those of the driving gear. The control ring is further provided with an internal projection which coacts with certain of the external teeth of the sliding gear for enabling at most a limited relative rotation of these two coaxial members.

Pursuant to a more particular feature of my invention, the internal projection of the control ring is separated from the adjoining external teeth of the sliding gear by a clearance allowing relative rotation thereof by a fraction of a turn, the internal projection and the adjoining gear teeth advantageously having interacting formations which prevent relative axial shifts of the ring and the gear upon deviation thereof from a predetermined unstable relative angular position. When the continuously rotating driving gear contacts the control ring in its intermediate axial position while the driven shaft is stationary or rotates at a speed different from that of the countershaft, the control ring and the sliding gear leave their unstable relative angular position (if they have previously occupied same) whereby an axial shifting of the sliding gear into its engaged position is blocked until the unstable relative angular position can be restored. If the interacting formations have beveled edges enabling relative camming displacement, such restoration can take place under continuing axial pressure upon the achievement of synchronism and the resulting disappearance of a torque tending to maintain the blocked state. In the absence of such beveled edges, meshing engagement may take place when the assembly passes through a point of synchronism with reversal of the relative torque between the sliding gear and the control ring which places these two members momentarily in their unstable angular position.

BRIEF DESCRIPTION OF THE DRAWING

The above and other features of my present invention will now be described in detailed with reference to the accompanying drawing in which.

SPECIFIC DESCRIPTION

Figure 1:
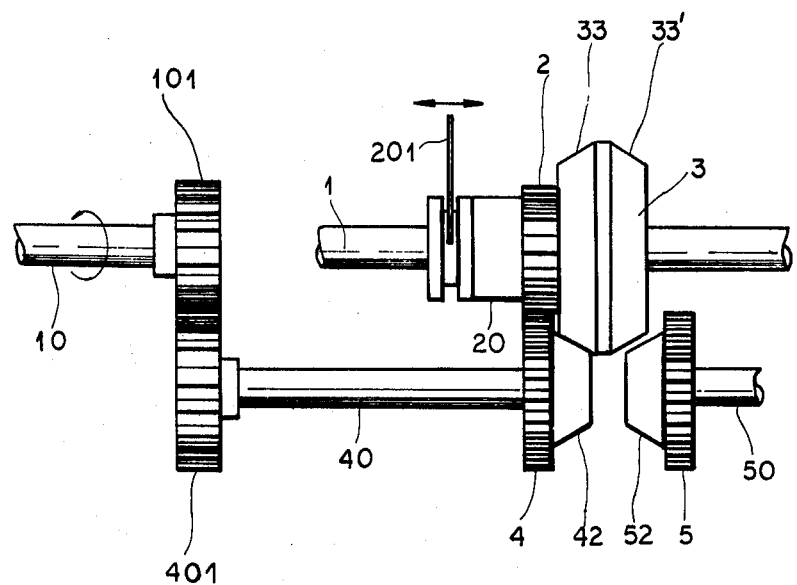
FIG. 1 is a somewhat diagrammatic view of part of an automotive gear transmission provided with a clutch assembly according to my invention.

The gear transmission shown in FIG. 1 comprises a continuously rotating first or drive shaft 10, powered for example by the engine of an automotive vehicle, which carries a pinion 101 in constant mesh with a gear 401 on a countershaft 40. The driving gear 4 on countershaft 40 confronts a similar gear 5 on another countershaft 50 coaxial therewith but rotated at different speed (possibly in the reverse direction) from drive shaft 10 via a nonillustrated additional gear train.

Figure 2:
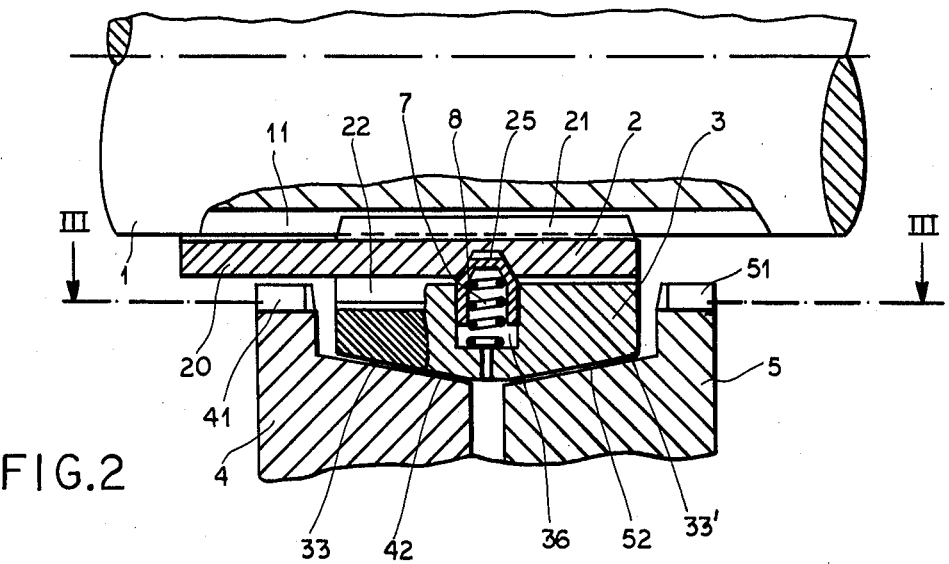
FIG. 2 is a partly sectional view of a portion of the clutch assembly of FIG. 1, drawn to a larger scale and taken on the line II—II of FIG. 3.

A second or driven shaft 1, parallel to countershafts 40 and 50, carries a sliding gear 2 which is nonrotatably mounted thereon by a key 21 engaging in a keyway 11 as shown in FIG. 2; it will be apparent that the key and keyway could be replaced by a spline coupling. Sliding gear 2 is coaxially surrounded by a control ring 3, referred to in this instance as a synchro ring, with which it is releasably coupled by preferably three peripherally equispaced detents. One such detent, shown in FIG. 2, comprises a coil spring 7 received in a cap 8 which is guided in a radial bore 36 of ring 3 and whose tapered end plays in a peripheral groove 25 of gear 2; this groove has a trapezoidal profile enabling the camming dislodgment of cap 8 in response to strong relative axial pressure. Such pressure can be exerted by a shift fork 201 engaging in a groove of a cylindrical skirt 20 integral with gear 2. The detents could also be in the form of spring-loaded ball checks as discussed above.

Synchro ring 3 has two frustoconical peripheral surface portions 33 and 33' confronting similarly tapered peripheral surfaces 42 and 52 of driving gears 4 and 5. In the centered position of disengagement illustrated in FIG. 2, the frustoconical surfaces 33 and 33' of ring 3 are separated by a small clearance from the confronting gear surfaces 42 and 52. The gap between surfaces 33 and 42 disappears upon a shift of sliding gear 2 and ring 3 to the left, i.e. toward gear 4, into an intermediate position in which external teeth 22 of gear 2 closely approach but do not engage teeth 41 of gear 4. The same applies to the gap between surfaces 33' and 52 upon a rightward shift bringing the teeth 22 of gear 2 close to the teeth 51 of gear 5.

Figure 3:
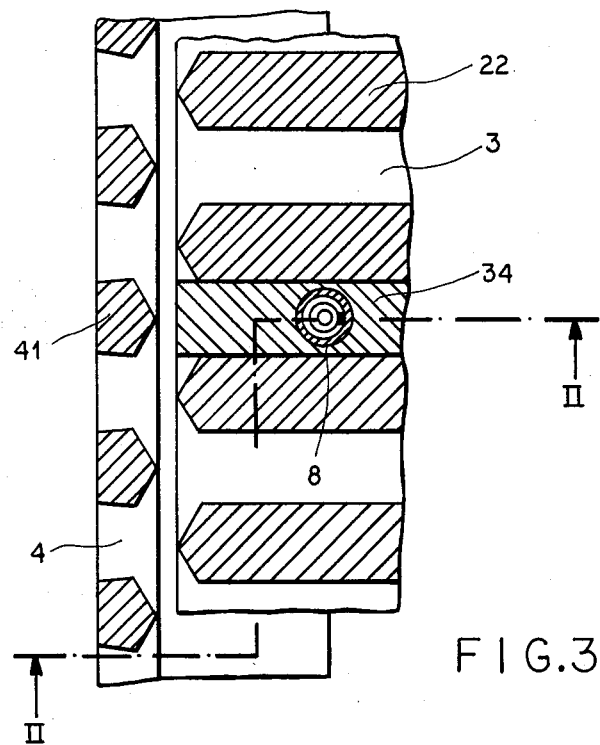
FIG. 3 is a fragmentary developed view taken on the line III—III of FIG. 2.

An internal projection of ring 3, shown in FIG. 3 as a ridge 34, lies between two of the teeth 22 of gear 2 to prevent any major relative rotation thereof; in the embodiment of FIG. 3, ridge 34 fits closely between teeth 22 so as completely to eliminate such rotation. Ridge 34 may be one of a plurality of peripherally equispaced identical projections, preferably three. These ridges, or other projections described hereinafter, may be integral with the ring body or may be secured thereto by fasteners not shown. They also form convenient sites for the detents 7, 8.

In the developed view of FIG. 3, as well as in those of FIGS. 4, 5, 7 and 8, gear teeth 22 have been shown only in part; it will be understood that the nonillustrated right-hand ends of these teeth, confronting the teeth 51 of gear 5, are symmetrical to those shown at left.

Figure 7:
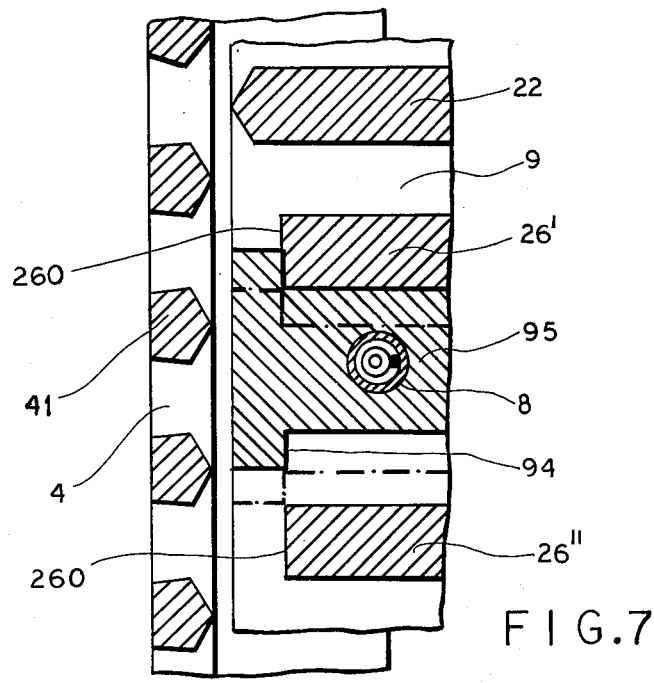

When the gap between teeth 22 and 41 is reduced to almost zero by a leftward shift of gear 2 and sleeve 3, the frictional contact between surfaces 33 and 42 (FIGS. 1 and 2) will rotatably entrain the clutch assembly 2, 3 on shaft 1 to establish substantial synchronism between this shaft and countershaft 40. At this point the fork 201 of FIG. 1 may be moved further to the left with axial decoupling of gear 2 from ring 3 and meshing engagement of gears 2 and 4 as illustrated in FIG. 7.

Upon a return of gear 2 to its centered position, detent caps 8 re-enter the groove 25 of gear 2 to restore the axial coupling between this gear and the ring 3.

Figure 4:
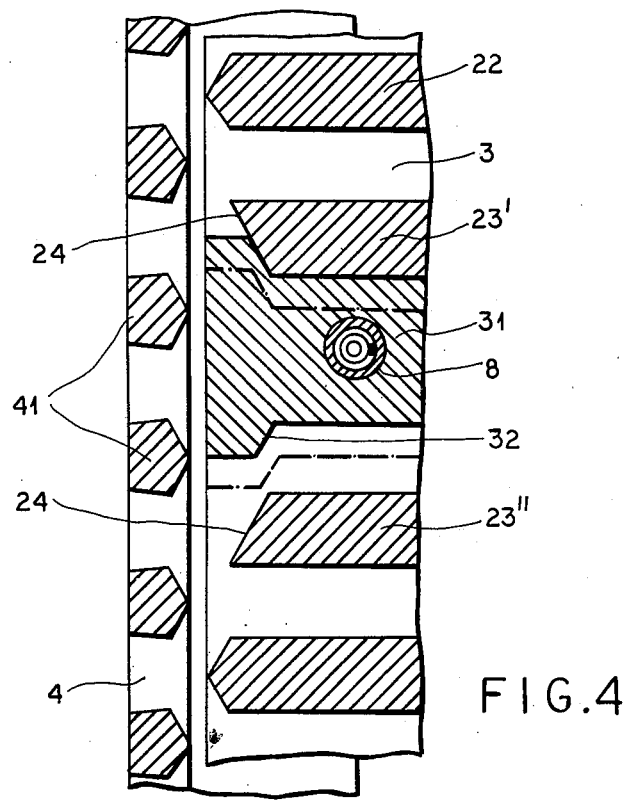

The clutch assembly of FIG. 4 differs from that of FIG. 3 in that the straight ridge 34 has been replaced by a generally I-shaped projection 31 whose transverse arms, only one of which is shown, each have a pair of beveled camming edges 32, one of these edges at each end coming to rest against a similar edge 24 of a foreshortened tooth 23' which is one of a pair of such foreshortened teeth 23', 23" bracketing each ridge 31. In an unstable relative angular position, illustrated in phantom lines, ridge 31 is separated by small clearances from teeth 23', 23" whose spacing from each other is sufficient to clear the broadened end of the ridge when after the establishment of synchronization, the axial thrust exerted upon sliding gear 2 brings its full-length teeth 22 into a meshing engagement with teeth 41 of gear 4. As noted above, the illustrated blocking position between ridge 31 and teeth 23' is brought about by an incipient clutching motion which brings the ring 3, still indexed to gear 2, into an intermediate position of frictional entrainment by the constantly rotating lateral gear 4. The relative torque then existing between ring 3 (assumed to be entrained upward as viewed in FIG. 4) and the initially nonrotating gear 2 not only eliminates the separation (if any) between ridge 31 and tooth 23' but also maintains the illustrated blocking position until clutch assembly 2, 3 and gear 4 rotate at the same peripheral speed. At this point the continuing axial pressure manually exerted upon the fork 201 of FIG. 1 allows ridge 31 and tooth 23' to be cammed apart for completion of the clutch-in. Analogously, teeth 22 can be brought into meshing engagement with teeth 51 of gear 5 upon a shift to the right.

Figure 5:
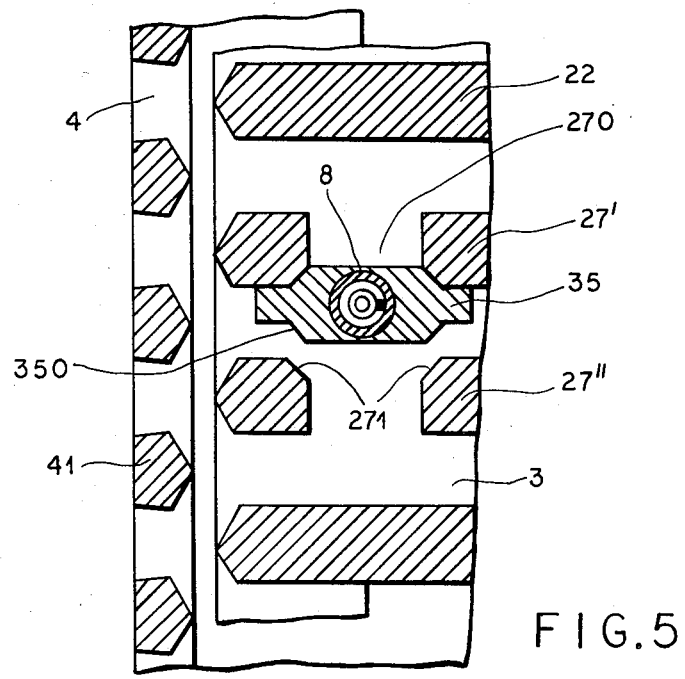
FIGS. 4 and 5 are developed views similar to FIG. 3, illustrating certain modifications.

FIG. 5 shows a modification of the arrangement just described with replacement of the I-shaped ridge 31 by a somewhat shorter ridge 35 bracketed by two split teeth 27', 27" forming gaps 270. Ridge 35 has a pair of lateral extensions forming beveled edges 350 which, in the illustrated blocking position, come to rest against similarly beveled gap edges 271 of split tooth 27'. The mode of operation of this embodiment is essentially the same as that of the assembly of FIG. 3, except that the split teeth 27', 27"—in contrast to the foreshortened teeth 23', 23"—enter between gear teeth 41 or 51 concurrently with the normal teeth 22 of sliding gear 2.

Figure 6:
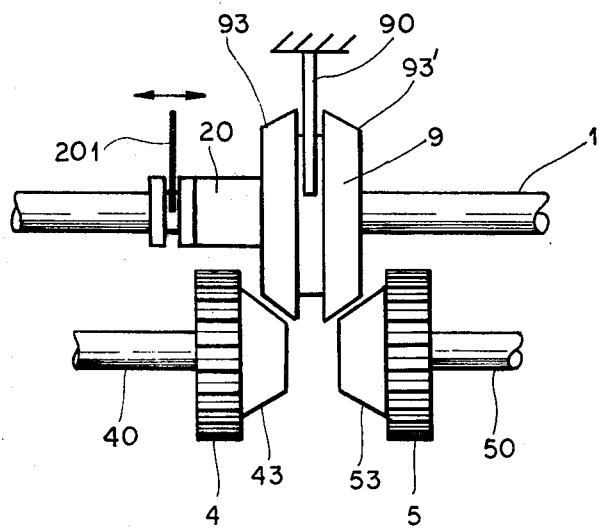
FIG. 6 is a view similar to FIG. 1, illustrating a modified clutch assembly according to my invention.

In FIG. 6 I have illustrated an alternate arrangement in which the synchro ring 3 of FIGS. 1–5 has been replaced by a lock-out ring 9 which has only an indirect synchronizing effect. A stationary fork 90 limits the axial displacement of ring 9 to allow only a slight contact between its tapering surface portions 93, 93' and peripheral surfaces 43, 53 of gears 4 and 5. The vertex angle of these frustoconical surfaces may be substantially less than in the aforedescribed instances. An internal projection of lock-out ring 9, interacting with the teeth of sliding gear 2, is shown in FIG. 7 to be an I-shaped ridge 95 similar to ridge 31 of FIG. 4 but lacking the beveled edges 32 thereof. By the same token, foreshortened teeth 26', 26" flanking the ridge 95 have blunt ends abutting one or the other transverse arm of the "I" in a blocking position such as that illustrated in FIG. 7. A slight frictional contact existing in an off-center position of ring 9 between that ring and one of the continuously rotating driving gears, here gear 4, suffices to establish this blocking position in the absence of synchronous rotation but does not entrain the ring 9 with enough force to equalize the peripheral speeds of shafts 1 and 40. When such equalization has been brought about by external means, as by deceleration of the engine of a rolling vehicle whose wheels are coupled with driven shaft 1, the resulting reversal of the relative rotation of sliding gear 2 and frictionally driven ring 9 momentarily places the ridge 95 in its unstable phantom-line position midway between teeth 26' and 26" wherein axial pressure upon gear 2 allows its teeth 22 to enter into meshing engagement with teeth 41 of gear 4. Again, a similar mode of operation will enable interengagement of teeth 22 and 51.

Figure 8:
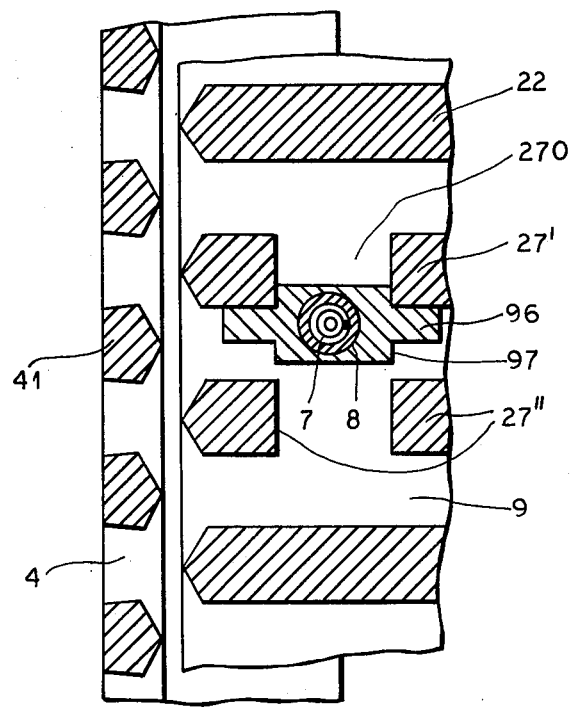
FIGS. 7 and 8 are developed views similar to FIGS. 3-5 but relating to the clutch assembly of FIG. 6.

In FIG. 8, finally, I have shown a modification of the arrangement of FIG. 7 in which a ridge 96, generally similar to ridge 35 of FIG. 5 but lacking its beveled edges 350, interacts with a pair of split teeth 27', 27" forming straight-edged gaps 270. Here, too, the illustrated blocking position prevents a relative axial shifting of sliding gear 2 and lock-out ring 9 until a torque reversal centers the ridge 96 between the two split teeth 27', 27".

Whereas the clutch assembly of FIGS. 1-5 may be used with driven shaft 1 stationary, e.g. for shifting into "first gear" or "reverse", the arrangement of FIGS. 6-8 requires shaft 1 to rotate prior to clutch-in, being thus usable for upshifting or downshifting into "second gear", for example. At least in the latter instance, therefore, shafts 1 and 10 must also be connectable to each other by some other part of the transmission, possibly via a fluid coupling.

It is, however, also possible to interconnect the control ring 9 and the sliding gear 2 by weak resilient means (possibly a spiral spring) tending to hold the ridge 95 or 96 centered between teeth 26', 26" or 27', 27" in the absence of an overriding torque whereby the clutch assembly shown in FIGS. 7 or 8 operates in essentially the same manner as that of FIGS. 4 or 5, respectively.

The two unshiftable lateral gears 4 and 5 need not be coaxial with each other, as shown. Also, though the second or main shaft has been described as the driven one, my invention is applicable to an inverted transmission system in which shaft 1 rotates continuously and drives one or the other gear 4, 5 upon being selectively coupled thereto by the disclosed clutch assembly.

I claim:

1. In a gear transmission for selectively coupling a first shaft with a second shaft having a sliding gear nonrotatably mounted thereon, said first shaft being coupled with an unshiftable gear which is offset from the axis of said second shaft and has teeth engageable by external teeth of said sliding gear upon axial shifting thereof from a disengaged position into an engaged position, the combination therewith of a control ring coaxially surrounding said sliding gear, indexing means releasably coupling said ring and said sliding gear for joint axial displacement, said ring being further provided with an internal projection coacting with certain of said external teeth for enabling at most a limited relative rotation of said sliding gear and said ring, and operating means for shifting said sliding gear from said position of disengagement to said engaged position, said ring and said unshiftable gear being formed with confronting tapered peripheral surfaces contacting each other upon a shifting of said sliding gear into an intermediate position for setting said ring and said sliding gear in rotation prior to meshing of said external teeth with the teeth of said unshiftable gear.

2. The combination defined in claim 1 wherein said internal projection is separated from said certain of said external teeth by a clearance allowing relative rotation of said sliding gear and said ring by a fraction of a turn, said internal projection and said certain of said external teeth having interacting formations preventing relative axial shifting of said ring and said sliding gear upon deviation thereof from a predetermined relative angular unblocking position.

3. The combination defined in claim 1 wherein said interacting formations include beveled edges enabling relative camming displacement into said relative angular position upon synchronous rotation of said unshiftable gear and said sliding gear with said ring retained in said intermediate position by the contacting tapered peripheral surfaces.

4. The combination defined in claim 2 or 3 wherein said internal projection is an axially extending ridge with transverse arms, said certain of said external teeth having foreshortened ends interceptable by said arms.

5. The combination defined in claim 2 or 3 wherein said certain of said external teeth are provided with gaps, said internal projection being an axially extending ridge with transverse extensions receivable in said gaps.

6. The combination defined in claim 1, 2 or 3 wherein said unshiftable gear is one of two generally symmetrical unshiftable gears flanking said ring and said sliding gear, the tapering peripheral surface of said ring having substantially symmetrical portions contacting respective peripheral surfaces of said unshiftable gears upon a shifting of said sliding gear into either of two intermediate positions on opposite sides of said disengaged position.

* * * * *

UNITED STATES PATENT AND TRADEMARK OFFICE
CERTIFICATE OF CORRECTION

PATENT NO. : 4,280,370
DATED : 28 July 1981
INVENTOR(S) : Friedrich SCHREINER

It is certified that error appears in the above—identified patent and that said Letters Patent are hereby corrected as shown below:

In the Abstract, line 5, for "ball checks" read -- spring--loaded detents --.

Column 1, line 23, for "transmission" read -- transmissions --;

line 28, for "gears" read -- teeth --.

Column 3, line 7, for "The" read -- A --;

line 68, for "FIG. 7" read -- FIG. 1 --.

Column 4, line 15, for "when" read -- when, --.

Signed and Sealed this

Twenty-seventh Day of October 1981

[SEAL]

Attest:

Attesting Officer

GERALD J. MOSSINGHOFF

Commissioner of Patents and Trademarks